US011861648B2

United States Patent
Andrews et al.

(10) Patent No.: US 11,861,648 B2
(45) Date of Patent: Jan. 2, 2024

(54) LOYALTY ACCOUNT IDENTIFICATION

(71) Applicant: Google LLC, Mountain View, CA (US)

(72) Inventors: Mark William Andrews, San Francisco, CA (US); Richard Tsuwen Hung, Los Altos, CA (US); Robin Dua, San Franisco, CA (US); Marcus Quintana Mitchell, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 280 days.

(21) Appl. No.: 16/995,578

(22) Filed: Aug. 17, 2020

(65) Prior Publication Data

US 2021/0035147 A1 Feb. 4, 2021

Related U.S. Application Data

(60) Division of application No. 15/667,215, filed on Aug. 2, 2017, now abandoned, which is a continuation of
(Continued)

(51) Int. Cl.
*G06Q 30/00* (2023.01)
*G06Q 30/0226* (2023.01)
(Continued)

(52) U.S. Cl.
CPC ....... *G06Q 30/0226* (2013.01); *G06Q 20/325* (2013.01); *G06Q 20/36* (2013.01); *G06Q 30/0229* (2013.01); *G06Q 30/0238* (2013.01)

(58) Field of Classification Search
CPC .................................. G06Q 30/0207–30/0277
(Continued)

(56) References Cited

U.S. PATENT DOCUMENTS 5,704,046 A    12/1997 Hogan
6,061,660 A     5/2000 Eggleston et al.
(Continued)

FOREIGN PATENT DOCUMENTS

KR    20040067384 A    7/2004
KR      101079859 B1   10/2011
(Continued)

OTHER PUBLICATIONS

International Search Report and Written Opinion for PCT/US2013/075512, dated Apr. 14, 2014, 12 pages.
(Continued)

*Primary Examiner* — Matthew T Sittner
(74) *Attorney, Agent, or Firm* — Dority & Manning, P.A.

(57) ABSTRACT

Using identifiers on user payment instruments to identify user loyalty accounts comprises a method to store a loyalty account list associated with a user, the loyalty account list comprising one or more user loyalty accounts; associate an identifier with the loyalty account list; receive information identifying a user loyalty account associated with a merchant, the information comprising an account number for the user loyalty account and an identity of the merchant; associate the user loyalty account with the loyalty account list; receive a request for information identifying a user loyalty account associated with a merchant, the request comprising the identifier received by the merchant from a user payment instrument and an identity of the merchant; determine the user loyalty account associated with the merchant; and provide the information identifying a user loyalty account associated with a merchant.

10 Claims, 4 Drawing Sheets

Related U.S. Application Data application No. 13/715,543, filed on Dec. 14, 2012, now abandoned.

(51) Int. Cl.
  *G06Q 30/0238*  (2023.01)
  *G06Q 20/32*   (2012.01)
  *G06Q 20/36*   (2012.01)

(58) Field of Classification Search
  USPC .................................................. 705/14, 319
  See application file for complete search history.

(56) References Cited

U.S. PATENT DOCUMENTS

| | | | |
|---|---|---|---|
| 7,359,866 | B2 | 4/2008 | Farat |
| 7,398,225 | B2 | 7/2008 | Voltmer et al. |
| 7,613,629 | B2 | 11/2009 | Antonucci et al. |
| 7,933,841 | B2 | 4/2011 | Schmeyer et al. |
| 7,993,197 | B2 | 8/2011 | Kaminkow |
| 8,050,968 | B2 | 11/2011 | Antonucci et al. |
| 8,150,844 | B2 | 4/2012 | Redstone et al. |
| 8,561,894 | B1 | 10/2013 | Mullen et al. |
| 8,939,357 | B1* | 1/2015 | Perry .................. G06Q 20/387 235/379 |
| 2002/0062249 | A1 | 5/2002 | Iannacci |
| 2002/0082920 | A1 | 6/2002 | Austin et al. |
| 2002/0133400 | A1 | 9/2002 | Terry et al. |
| 2004/0054581 | A1 | 3/2004 | Redford et al. |
| 2004/0111360 | A1 | 6/2004 | Albanese |
| 2004/0128197 | A1 | 7/2004 | Bam et al. |
| 2004/0249710 | A1 | 12/2004 | Smith et al. |
| 2005/0234789 | A1 | 10/2005 | Czyzewski |
| 2005/0251446 | A1 | 11/2005 | Jiang et al. |
| 2006/0011719 | A1 | 1/2006 | Lehtonen et al. |
| 2006/0053056 | A1 | 3/2006 | Alspach-Goss et al. |
| 2006/0208064 | A1 | 9/2006 | Mendelovich et al. |
| 2006/0224454 | A1 | 10/2006 | Kantor et al. |
| 2008/0168099 | A1 | 7/2008 | Skaf |
| 2009/0037275 | A1 | 2/2009 | Pollio |
| 2009/0191933 | A1 | 7/2009 | French |
| 2009/0289111 | A1 | 11/2009 | Motycka et al. |
| 2009/0299844 | A1 | 12/2009 | Reilly et al. |
| 2010/0010889 | A1 | 1/2010 | Antonucci |
| 2010/0042517 | A1 | 2/2010 | Paintin et al. |
| 2010/0114661 | A1 | 5/2010 | Alderfer et al. |
| 2010/0123012 | A1 | 5/2010 | Kaperst |
| 2010/0125490 | A1 | 5/2010 | Kiciman et al. |
| 2010/0211445 | A1 | 8/2010 | Bodington |
| 2010/0287039 | A1 | 11/2010 | Telles |
| 2010/0312629 | A1 | 12/2010 | Wolf et al. |
| 2011/0082731 | A1 | 4/2011 | Kepecs |
| 2011/0155800 | A1 | 6/2011 | Mastrangelo et al. |
| 2011/0180598 | A1 | 7/2011 | Morgan et al. |
| 2011/0246284 | A1 | 10/2011 | Chaikin et al. |
| 2011/0270665 | A1 | 11/2011 | Kim et al. |
| 2011/0270720 | A1 | 11/2011 | Manohar |
| 2012/0166267 | A1 | 6/2012 | Beatty et al. |
| 2012/0166270 | A1 | 6/2012 | Coppinger |
| 2012/0215605 | A1 | 8/2012 | Gardner et al. |
| 2012/0238337 | A1 | 9/2012 | French |
| 2012/0239474 | A1 | 9/2012 | Healy et al. |
| 2012/0253914 | A1 | 10/2012 | Black |
| 2012/0316945 | A1 | 12/2012 | Wolf et al. |
| 2013/0046604 | A1 | 2/2013 | Jones et al. |
| 2013/0054470 | A1 | 2/2013 | Campos et al. |
| 2013/0226686 | A1* | 8/2013 | Grossman .............. G06Q 30/02 705/14.27 |
| 2014/0172533 | A1 | 6/2014 | Andrews et al. |
| 2014/0222539 | A1* | 8/2014 | Scholz .............. G06Q 30/0226 705/14.27 |
| 2014/0257958 | A1 | 9/2014 | Andrews |

FOREIGN PATENT DOCUMENTS

| | | |
|---|---|---|
| WO | WO2014/093993 A1 | 6/2014 |
| WO | WO2014/138170 A1 | 9/2014 |

OTHER PUBLICATIONS

International Search Report and Written Opinion for PCT/US2014/020559, dated Jun. 24, 2014, 11 pages.
International Search Report on Patentability for PCT/US2013/075512, dated Jun. 25, 2015, 9 pages.
International Search Report on Patentability for PCT/US2014/020559, dated Sep. 17, 2015, 8 pages.
Office Action from U.S. Appl. No. 13/353,312 dated May 21, 2013, 7 pages.
Office Action from U.S. Appl. No. 13/353,312 dated Oct. 9, 2013, 9 pages.
Office Action from U.S. Appl. No. 13/594,748 dated Aug. 27, 2014, 15 pages.
Office Action from U.S. Appl. No. 13/594,748 dated Jun. 19, 2013, 12 pages.
Office Action from U.S. Appl. No. 13/594,748 dated Nov. 26, 2014, 11 pages.
Office Action from U.S. Appl. No. 13/594,748 dated Oct. 2, 2015, 14 pages.
Office Action from U.S. Appl. No. 13/715,543 dated Dec. 4, 2013, 13 pages.
Office Action from U.S. Appl. No. 13/715,543 dated Dec. 12, 2017, 12 pages.
Office Action from U.S. Appl. No. 13/715,543 dated Feb. 3, 2015, 22 pages.
Office Action from U.S. Appl. No. 13/715,543 dated Mar. 24, 2016, 9 pages.
Office Action from U.S. Appl. No. 13/715,543 dated May 8, 2013, 10 pages.
Office Action from U.S. Appl. No. 13/715,543 dated May 18, 2015, 20 pages.
Office Action from U.S. Appl. No. 13/715,543 dated Oct. 6, 2016, 10 pages.
Office Action from U.S. Appl. No. 13/786,055 dated Aug. 13, 2015, 25 pages.
Office Action from U.S. Appl. No. 13/786,055 dated Feb. 24, 2016, 25 pages.
Office Action from U.S. Appl. No. 13/786,055 dated Jan. 14, 2015, 20 pages.
Office Action from U.S. Appl. No. 13/786,055 dated Mar. 10, 2017, 28 pages.

* cited by examiner

LOYALTY ACCOUNT IDENTIFICATION

PRIORITY CLAIM

The present application is a divisional of U.S. application Ser. No. 15/667,215 having a filing date of Aug. 2, 2017, which is a continuation of U.S. application Ser. No. 13/715,543 having a filing date of Dec. 14, 2012. Applicant claims priority to and the benefit of each of such applications and incorporate all such applications herein by reference in their entirety.

TECHNICAL FIELD

The present disclosure relates generally to loyalty systems, and more particularly to using an identifier on a user payment instrument to identify a user loyalty account.

BACKGROUND

In conventional merchant-consumer relationships, users must maintain loyalty account identification cards to access a loyalty account. The user presents a loyalty card or other loyalty identifier to the merchant at a point of sale terminal. The merchant can access the loyalty account of the user and apply the transaction details to the loyalty account. For example, the merchant system can record the value of the transaction and apply the appropriate number of reward points to the loyalty account. In another example, the merchant system can identify a particular product and note that the product has been purchased, as in a "buy 4, get 1 free" promotion. In another example, the loyalty account can register a visit of the user, such as at a fitness club or a religious organization. Any other loyalty account can utilize a loyalty card or other identifier.

The different merchants frequented by a user may each require a different loyalty account identification card. Thus, a user may be required to maintain 10 or 20 different cards to obtain loyalty reward points at each of the many associated merchants. A loyalty account user in conventional loyalty programs is unable to use a payment instrument card or user device to allow the merchant to access one or more of the multiple loyalty accounts of the user.

SUMMARY

One aspect of the example embodiments described herein provides a computer-implemented method to use identifiers on user payment instruments to identify user loyalty accounts. A payment system employs a server configured to store, using one or more computing devices, a loyalty account list associated with a user, the loyalty account list comprising one or more user loyalty accounts; associate an identifier with the loyalty account list; receive information identifying a user loyalty account associated with a merchant, the information comprising an account number for the user loyalty account and an identity of the merchant; associate the user loyalty account with the loyalty account list; receive a request for information identifying a user loyalty account associated with a merchant, the request comprising the identifier received by the merchant from a user payment instrument and an identity of the merchant; determine the user loyalty account associated with the merchant based at least in part on the identifier received by the merchant from the user payment instrument and the identity of the merchant; and provide the information identifying a user loyalty account associated with a merchant.

Another aspect of the example embodiments described herein provides a payment instrument, comprising a rigid structure and a machine-readable portion affixed to the rigid structure, the machine-readable portion comprising payment information for a payment account and a loyalty account list identifier having associated therewith in a computing system a plurality of loyalty accounts that are each associated with a respective one of a plurality of merchants.

These and other aspects, objects, features and advantages of the example embodiments will become apparent to those having ordinary skill in the art upon consideration of the following detailed description of illustrated example embodiments, which include the best mode of carrying out the invention as presently presented.

DETAILED DESCRIPTION OF THE EXAMPLE EMBODIMENTS

Overview

In an example embodiment, a payment instrument contains an identifier of a user loyalty account list on a loyalty system. The payment instrument can be a credit card, debit card, proxy card, stored value card, peer-to-peer payment card, or any suitable physical card or payment instrument. Additionally or alternatively, the payment instrument can be a digital wallet or other payment instrument on a user computing device such as a mobile phone. Additionally or alternatively, the payment instrument can be any other type of wireless payment instrument, such as an RFID device. Additionally or alternatively, the payment instrument can be a digital wallet or other payment instrument on a user computing device such as a desktop computer for conducting online transactions.

The identifier can be an identification number generated by the loyalty system or the user, or any other alpha-numeric code. The identifier can alternatively be embodied as a digital wallet identification. That is, the identifier can be a code that is associated with a user digital wallet account. Alternatively, the identifier can be any other number or word associated with the user, such as a driver's license number, or a randomly generated number or word. The user may have the option of selecting a desired identifier and may control information in the identifier that may be provided to a merchant.

The identifier can be embodied as a bar code that is printed or otherwise affixed to a payment instrument. For example, a payment instrument, such as a credit card, can have a bar code, QR code, or other identifier disposed thereon and capable of being scanned or otherwise read by a point of sale ("POS") terminal or other scanner. In certain embodiments, this identifier can be printed directly on the payment instrument or attached to the payment instrument using an adhesive.

Additionally or alternatively, the identifier can be encoded on the magnetic stripe on a payment card. For example, a data field on the magnetic stripe can contain the identifier and be read by the POS terminal when the payment card is swiped to provide the payment information from the payment card and the identifier to the POS terminal.

Additionally or alternatively, the identifier can be encoded on the secure element of a user computing device, such as a smartphone. The identifier can be transmitted as part of the information transmitted when the user "taps" or otherwise initiates a purchase transaction with the user computing device. The identifier can be transmitted as part of the payment information transmitted by the user computing device or as a separate transmission at or near the time of the transaction.

Additionally or alternatively, the identifier can be encoded into an RFID payment device or other payment instrument that can be swiped, tapped, or otherwise read at a POS terminal. Any other suitable manner of transmitting the identifier to the merchant can be employed. In certain embodiments, the RFID payment device can comprise payment information and the identifier that are communicated to the POS terminal when paying for a transaction. In certain other embodiments, an RFID label comprising the identifier can be affixed to an RFID payment device or other payment instrument via an adhesive, such as a payment card. In this case, the payment information and the identifier can be communicated to the POS terminal separately, although either substantially simultaneously or sequentially.

After receiving the identifier from the user, the merchant system recognizes the loyalty account list identifier and the loyalty system that contains the loyalty account list of the user. The merchant system queries the loyalty system for the user loyalty account that is associated with the merchant. The merchant system and the loyalty system can communicate via the Internet over the network, via email, via text, or any suitable communication technology. Additionally or alternatively, the identifier or other associated data can include instructions for locating the loyalty system and using the loyalty account list to identify a user loyalty account.

The loyalty system receives the request from the merchant system and accesses the loyalty account list associated with the user identifier. The loyalty system identifies from the user's loyalty account list the loyalty account of the user that is associated with the merchant system. The loyalty system provides the identified loyalty account number and any suitable details of the user loyalty account to the merchant system. Alternatively, the merchant system can access the loyalty list and select the appropriate loyalty account from the loyalty list.

The merchant system can use the loyalty account details of the user to access the loyalty account of the user on the merchant system. The merchant system can maintain the user loyalty account on a server at the merchant system location, on a remote server, on the POS terminal, or in any other suitable location. The merchant system can update the user loyalty account with the details of the current transaction.

Example System Architectures

Turning now to the drawings, in which like numerals represent like (but not necessarily identical) elements throughout the figures, example embodiments are described in detail.

Figure 1:
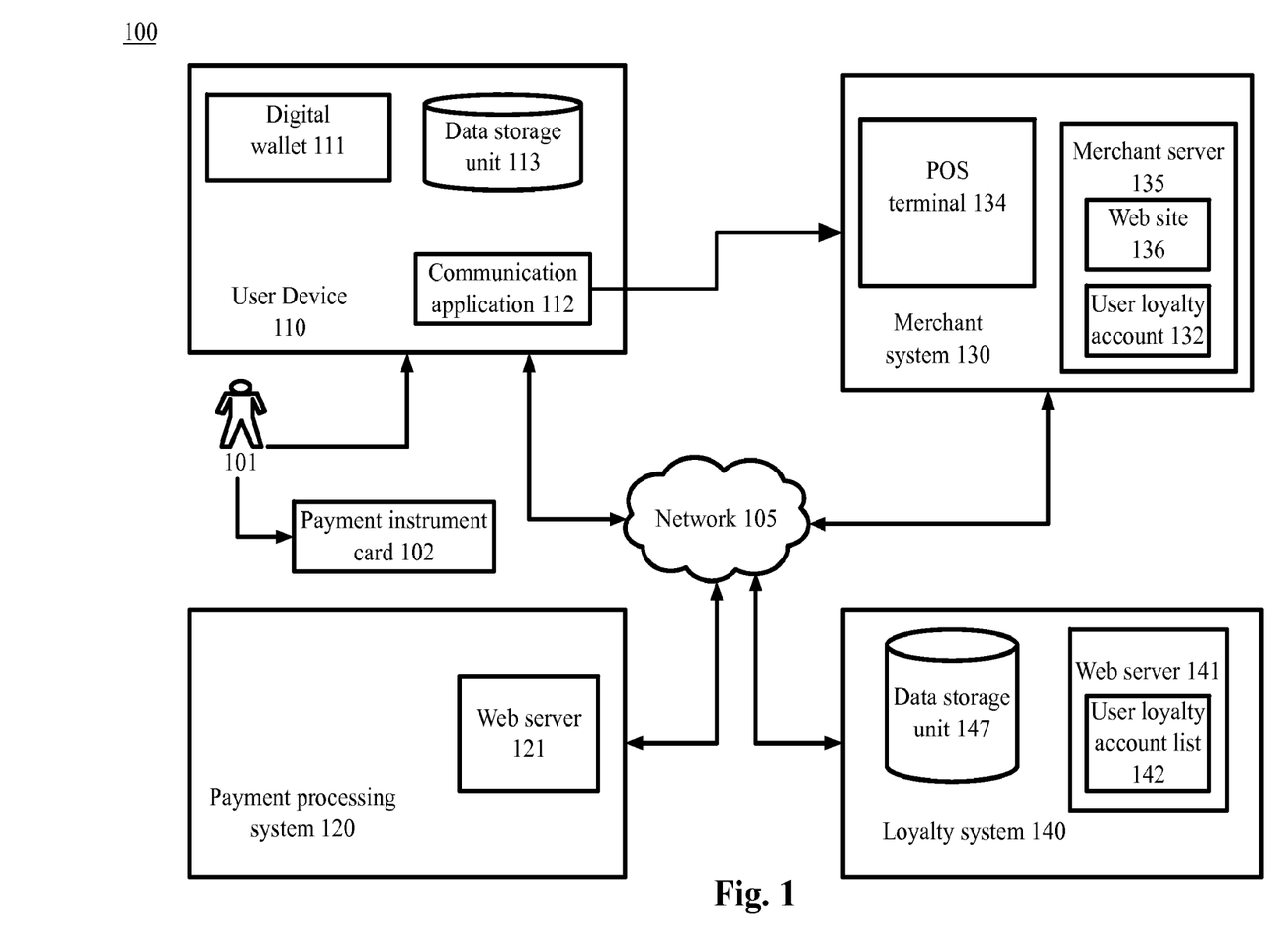
FIG. 1 is a block diagram depicting a system for using an identifier on a user payment instrument to identify a user loyalty account, in accordance with certain example embodiments.

FIG. 1 is a block diagram depicting a system for using an identifier on a user payment instrument to identify a user loyalty account, in accordance with certain example embodiments. As depicted in FIG. 1, the system 100 includes network devices 110, 120, 130, and 140 that are configured to communicate with one another via one or more networks 105.

Each network 105 includes a wired or wireless telecommunication means by which network devices (including devices 110, 120, 130, and 140) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 120, 130, and 140 includes a device having a communication module capable of transmitting and receiving data over the network 105. For example, each network device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 130, and 140 are operated by end-users or consumers, payment processing system operators, merchant operators, and loyalty system operators, respectively.

The user 101 can use the communication application 112, such as a web browser application or a stand-alone application, to view, download, upload, or otherwise access documents or web pages via a distributed network 105. The network 105 includes a wired or wireless telecommunication system or device by which network devices (including devices 110, 120, 130, and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including the point of sale terminal 134 of the merchant system 130, the merchant server 135 of the merchant system 130, and the web server 141 of the loyalty system 140.

The user network device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 also includes a data storage unit 113 accessible by the digital wallet application module 111 and the communication application 112. The example data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

The loyalty system 140 includes a data storage unit 147 accessible by the web server 141. The example data storage unit 147 can include one or more tangible computer-readable storage devices.

The user 101 can use a web server 141 on the loyalty system 140 to view, register, download, upload, or otherwise access the loyalty system 140 via a website (not illustrated) and a communication network 105. The user 101 associates one or more registered loyalty accounts with a loyalty account list 142 of the user 101. The loyalty system 140 can maintain the account list 142 and provide loyalty account information from the account list 142 to merchant systems 130 and authorized requesters. Each loyalty account 132 can be an account associated with a reward program, a frequent shopper program, a sales promotion program, or any suitable loyalty program that provides an incentive to a user 101 to patronize a merchant system 130. The user's 101 registration information and account list 142 is saved in the loyalty system's 140 data storage unit 147 and is accessible the by web server 141.

The user 101 can utilize a payment instrument card 102 to conduct a financial transaction. The payment instrument card 102 can be traditional credit card or other payment card. The traditional payment instrument card 102 can be embodied as a plastic card with a magnetic stripe containing the account information. The payment instrument card 102 can be embodied as any other type of card that can be used to initiate and conduct a transaction. For example, the payment instrument card 102 can be a card or other device with an RFID chip for conducting transactions, a card with a barcode or other machine-readable code, or any suitable type of physical payment instrument card 102.

The merchant system 130 may use a web server 135 to view, download, upload, create offers, sell products online, provide rewards, monitor loyalty accounts, or otherwise access the loyalty system 140 via a website 136 and a communication network 105. The merchant system 130 represents an entity that offers products for the user 101 to purchase or use. The merchant system 130 includes a point of sale ("POS") terminal 134. The POS terminal 134 may be operated by a salesperson that enters the purchase data into the POS terminal 134 to complete the purchase transaction. The merchant system 130 may be a physical location or an online merchant.

The merchant system 130 can maintain the user loyalty account 132 on the merchant server 135, on the POS terminal 134, a remote server, or a third party server. Alternatively, the loyalty account 132 may be maintained by a merchant system operator, such as a written system or a "punch" system.

The user 101 may request a purchase from the merchant system 130. In an example embodiment, the purchase is initiated by a wireless "tap" of the mobile device 110 with the POS terminal 134. In an alternative example embodiment, the purchase is initiated when the user 101 enters an account identification number at the POS terminal 134 or in the mobile device 110. In another alternative example embodiment, the purchase is initiated online with the merchant server 135. The purchase may be initiated via the merchant website 136. In yet another alternative example embodiment, the purchase is initiated by a magnetic stripe card 102 or other physical card. In yet another alternative example embodiment, the purchase is initiated by use of a permanent/temporary virtual/physical token, QR code, bar code, or other suitable machine-readable medium captured by a terminal reader or POS terminal 134. The merchant's POS terminal 134 interacts with an acquirer (for example Chase PaymentTech, or other third party payment processing companies), the card network (for example VISA, MasterCard, American Express, Discover or other card processing networks), the payment processing system 120, and the issuer (for example Citibank, CapitalOne, Bank of America, and other financial institutions to authorize payment).

The payment processing system 120 is used by the payment instrument 105 of the user 101 to conduct a financial transaction. The user 101 can use a web server 121 on the payment processing system 120 to view, register, download, upload, or otherwise access the payment processing system 120 via a website (not illustrated) and a communication network 105). The user 101 can configure one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101. The payment processing system 120 also may function as the issuer for the associated financial account. The user's 101 registration information is saved in the payment processing system's 120 data storage unit and is accessible the by web server 121.

Example Processes

The components of the example operating environment 100 are described hereinafter with reference to the example methods illustrated in FIG. 2.

Figure 2:
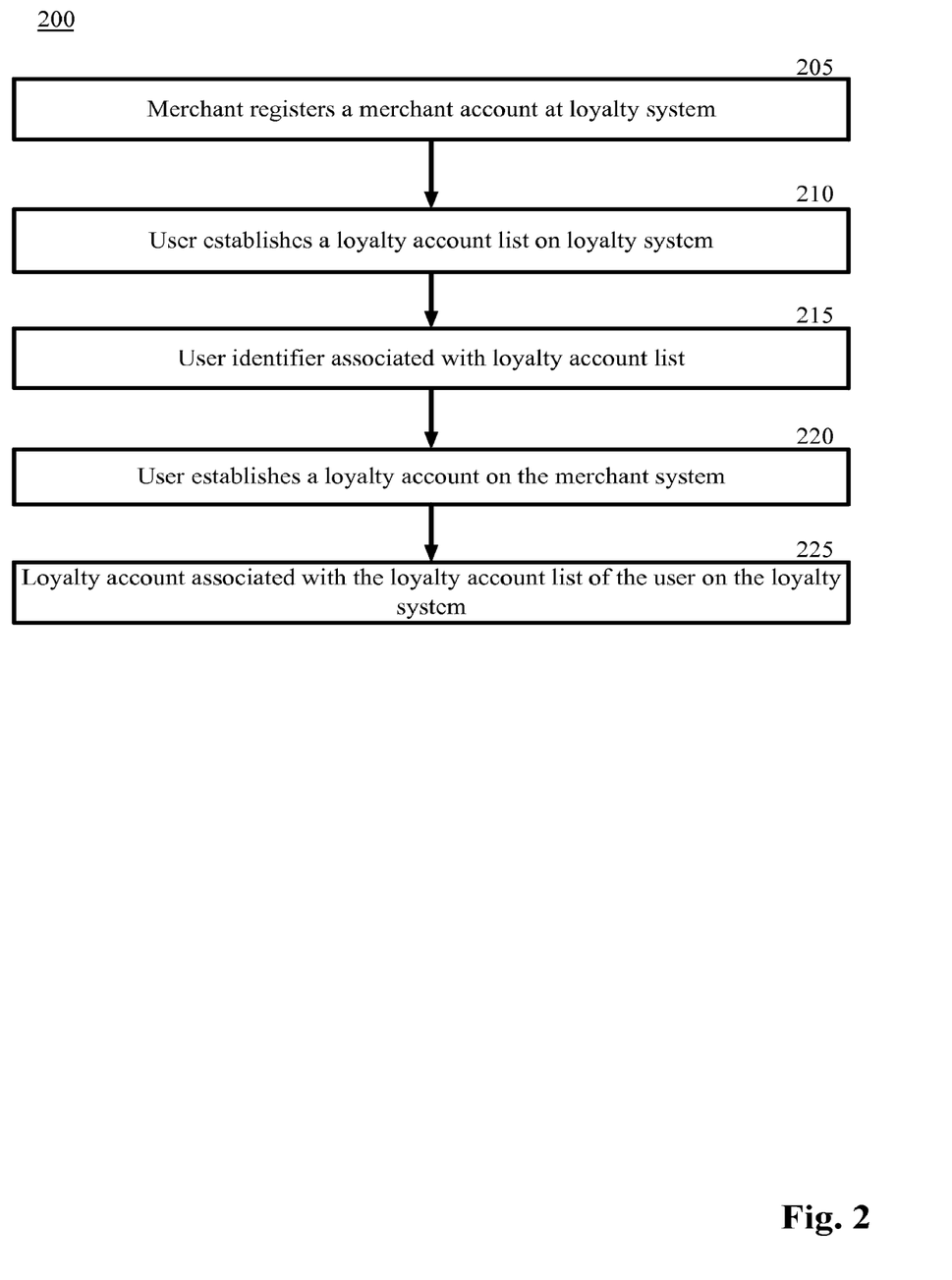
FIG. 2 is a block flow diagram depicting a method to configure a loyalty account list on a loyalty system, in accordance with certain example embodiments.

FIG. 2 is a block flow diagram depicting a method 200 to configure a loyalty account list 142 on a loyalty system 140, in accordance with certain example embodiments.

With reference to FIGS. 1 and 2, in block 205, a merchant system 130 registers with a loyalty system 140. The merchant system 130 can allow users 101 to maintain loyalty account identification on the loyalty system 140 instead of, or in addition to, a physical loyalty card or other loyalty program identification device. The loyalty system 140 may be a function of a payment processing system. Alternatively, the loyalty system 140 may be a function of the payment processing system, the merchant system 130, or any other suitable system. Alternatively, the loyalty system 140 may be an independent system that is not affiliated with a payment processing system, a payment instrument system, or any other system in the transaction processing stream.

In an alternative embodiment, the merchant system 130 is not registered with the loyalty system 140. The merchant system 130 can be given instructions by the loyalty system identifier to access the loyalty account list 142 on the loyalty system 140. For example, the digital wallet application module 111 on a user device 110 can transmit instructions to a merchant system 120 for accessing the loyalty account list 142.

In block 210, the user 101 establishes a loyalty account list 142 on a loyalty system 140. The user 101 can access the loyalty system 140 on a website on the loyalty system web server 141 and configure an account list 142. The user 101 also may create or update a user loyalty account 132 on a loyalty application (not shown) on the user device 110 or on a digital wallet application module 111 on the user device 110.

In block 215, the user 101 and/or the loyalty system 140 can associate an identifier with the loyalty account list 142. The identifier can be an identification number generated by the loyalty system 140 or the user 101, or any other alpha-numeric code. The identifier can alternatively be embodied as an identification number stored on the digital wallet application module 111 and other digital wallet account applications. That is, the identifier can be a code, username, phone number, or other suitable identifier that is associated with a user digital wallet account. The ID can be the identifier that the payment processing system 120 uses to identify the digital wallet account. Alternatively, the identifier can be any other number associated with the user 101, such as a driver's license number, or a randomly generated number or word.

In block 220, the user 101 establishes a user loyalty account 132 on the merchant system 130. The user 101 can register for a user loyalty account 132 for the merchant system 130 by completing an application at the location of the merchant system 130, at an online location of the merchant system 130, on a loyalty application on a user device 110, at any other suitable location, or via any suitable method. The user 101 can be registered automatically by the merchant system 130 by purchasing a product, requesting information from the merchant system 130, or by performing any qualifying action. The user 101 can be registered automatically by the merchant system 130 without performing any action. Any other suitable method for registering for a user loyalty account 132 can be employed.

The merchant system 130 can issue a physical loyalty card, assign a loyalty account number, provide a loyalty application, or provide any suitable user loyalty account 132 representation.

In block 225, the user loyalty account 132 is associated with the loyalty account list 142 of the user 101 on the loyalty system 140. In the example embodiment, the user 101 can add the user loyalty account 132 to the loyalty account list 142 and discard any loyalty card or other identifier provided by the merchant system 130.

The user loyalty account 132 can be added to the loyalty account list 142 via a website on the loyalty system web server 141, via a loyalty application (not shown) on the user device 110 or on a digital wallet application module 111 on the user device 110, or via any other suitable user interface system. The user 101 can add accounts, delete accounts, or in any suitable manner modify accounts. When adding a user loyalty account 132, the user 101 can provide a merchant system 130 name, location, contact information, or any other suitable merchant system 130 data. The user 101 can provide the loyalty account name, number, or other identifying information. The user 110 can provide any suitable rules or other data required for accumulating, redeeming, maintaining, or otherwise utilizing loyalty points are rewards. Any other suitable information can by added to the loyalty account list 142.

The user 101 can add more loyalty accounts to the loyalty account list 142 at the time of configuring the account list 142 or at any time in the future. The user 101 may maintain the list with any number of loyalty accounts 132 associated with any number of merchant systems 130 that the loyalty system 140 will allow. The number of accounts may be limited by the storage capacity of the server 141 or any other practical limits determined by the loyalty system 140.

From block 225, the method 200 ends.

Figure 3:
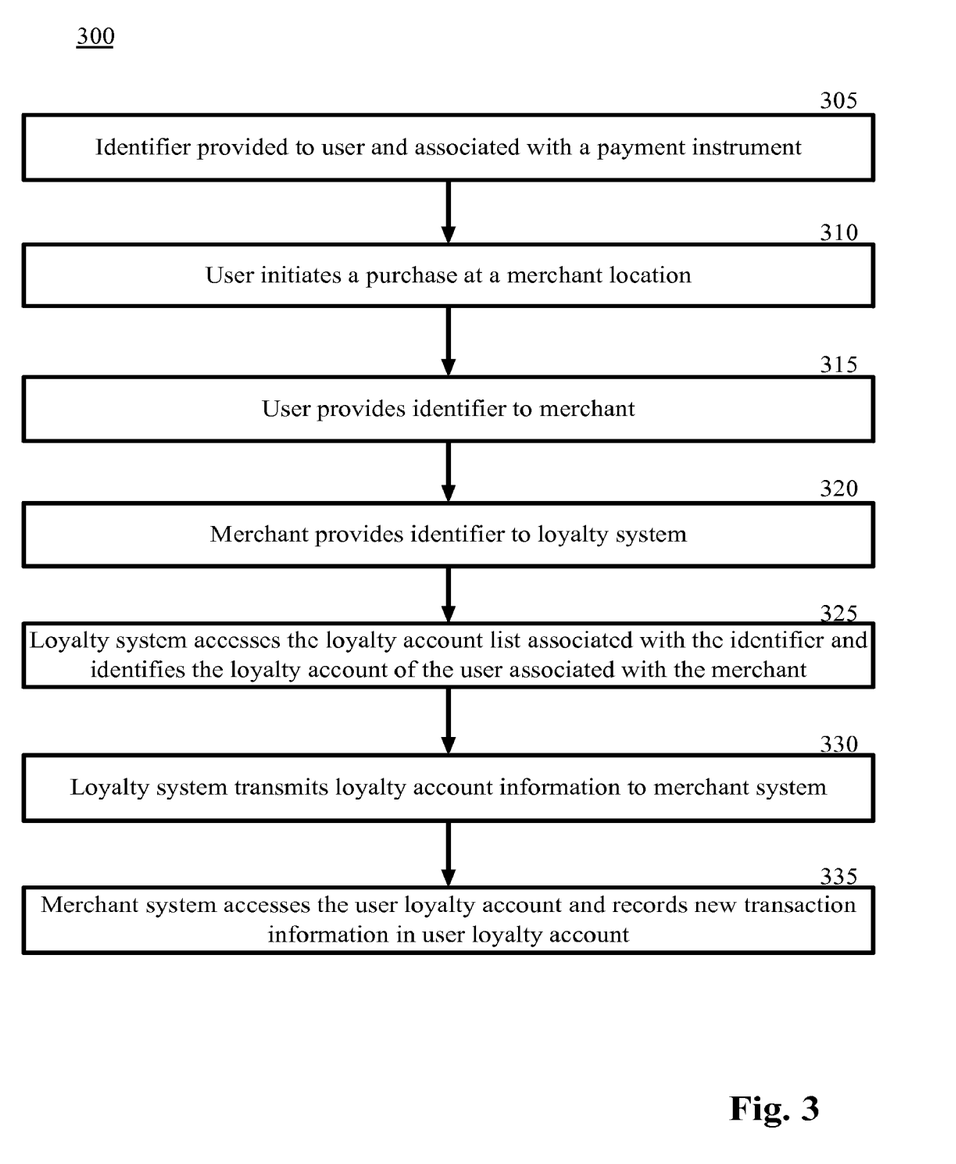
FIG. 3 is a block flow diagram depicting a method for using an identifier on a user payment instrument to identify a user loyalty account, in accordance with certain example embodiments.

FIG. 3 is a block flow diagram depicting a method 300 for using an identifier on a user payment instrument to identify a user loyalty account 132, in accordance with certain example embodiments.

In block 305, the loyalty account list identifier is provided to the user 101 and is associated with a payment instrument. For example, the identifier can be a bar code, QR code, or other identifier capable of being scanned by a point of sale ("POS") terminal or other scanner. The identifier can be affixed to a payment instrument card 102 such as a credit card or a debit card. The identifier can be a sticker affixed to the payment instrument, a decal printed on the payment instrument, or any other physical representation of the identifier affixed to the payment instrument.

The identifier can additionally or alternatively be encoded on the magnetic stripe on a payment instrument card 102. For example, a data field on the magnetic stripe can contain the identifier and be read by the POS terminal 134 when the payment instrument card 102 is swiped. Additionally or alternatively, the identifier can be encoded on the secure element of a user device 110 such as a smartphone. The identifier can be encoded into an RFID device or other payment instrument that can be swiped or tapped at a POS terminal 134. Any other suitable manner of transmitting the identifier to the merchant system 130 can be employed.

In block 310, a user 101 initiates a purchase at a location of a merchant system 130. The merchant system 130 can be at a physical merchant location or an online merchant location. The user 101 can select one or more products for purchase and initiate a transaction with the payment instrument card 102. As previously described, the initiation can be via a physical payment instrument, contactless transaction with a user device 110, or an online transaction.

In block 315, the identifier is provided to the merchant system 130. The identifier can be transmitted as part of the information transmitted when the user "taps" or otherwise initiates a purchase transaction with the user device 110. The identifier can be transmitted as part of the payment information transmitted by the user device 110 or as a separate transmission at or near the time of the transaction.

An identifier affixed to a payment instrument can be recognized by a barcode reader, QR code scanner, or any other suitable hardware or software of the merchant system 130. For example, a barcode can be read by the barcode scanner associated with a POS terminal 134 and transmitted to the merchant system server 135 or the POS terminal 134.

An identifier encoded on a payment instrument, such as a magnetic stripe payment instrument card 102 or RFID device, can be detected by the POS terminal 134. For example, if a data field on a magnetic stripe payment instrument card 102 contains the identifier and any needed instructions for accessing the loyalty system 140, the POS terminal 134 can recognize the identifier and instructions. Any other suitable manner of transmitting the identifier to the merchant can be employed.

The merchant system 130 can use the payment information transmitted by the payment instrument card 102, the user device 110, or other device to conduct the payment transaction. For example, the merchant system 130 can transmit a payment request to the payment processing system 120. The merchant system 130 and the payment processing system 120 can conduct the transaction via the card network, as a peer-to-peer transaction, or via any suitable manner. The transaction is a separate transaction from the transmitting of the identifier for the loyalty account list 142. The transmission of the identifier can be conducted at substantially the same time as the payment transaction or at any later time or earlier time. The loyalty system 140 and the payment processing system 120 can be functions of the same system or separate systems. In cases where the loyalty system 140 and the payment processing system 120 are part of the same system, the payment information and the loyalty account list identifier can be transmitted together.

In block 320, the merchant system 130 provides the identifier to the loyalty system 140. If the merchant system 130 has established rules for employing the loyalty system 140, then the merchant system 130 can provide the identifier to the loyalty system 140 and request the user loyalty account 132 data. The merchant system 130 may have previously received instructions from the loyalty system 140 for obtaining user loyalty account 132 information for a user 101. For example, the merchant system 130 may have previously employed the loyalty system 140, may use the loyalty system 140 for other transaction functions, or may for any reason have exchanged information with the loyalty system 140.

The merchant system 130 and the loyalty system 140 can communicate via any communication technology available such as an Internet connection over the network 105, via email, via text, or via any other suitable technology.

If the merchant system 130 does not recognize the identifier and the loyalty system 140 that is associated with the identifier, then the identifier can provide instructions for contacting the loyalty system 140 and receiving instructions for accessing the loyalty account list 142. For example, the identifier on a user device 110 that transmits the identifier wirelessly to a POS terminal 134 can further provide instructions for the merchant system 130 to communicate with the loyalty system 140. The instructions can provide a website location, a set of directions, or other information that can communicate the instructions for accessing the loyalty system 140.

In another example, instructions can be printed with a barcode, transmitted from an RFID device, encoded in a magnetic stripe payment instrument card 102, or in any suitable manner provided to the merchant system 130.

The merchant system 130 additionally can provide an identification of the merchant system 130. The identification can be any data or information that allows the loyalty system 140 to identify the merchant for the purposes of determining the appropriate loyalty account 132 from the loyalty account list 142. For example, the merchant system 130 can provide a name, code, username, password, phone number, or any other identification information that will allow the loyalty system 140 to select the appropriate loyalty account 132.

In block 325, the loyalty system 140 accesses the loyalty account list 142 associated with the identifier and identifies the user loyalty account 132 associated with the merchant system 130. In an example embodiment, the loyalty system 140 can identify a merchant system 130 requesting the user loyalty account information and determine the appropriate user loyalty account 132 from the account list 142. The loyalty system 140 then can provide the loyalty account 132 to the merchant system 130. In another example embodiment, the merchant system 130 can be provided with the account list 142 and provided an opportunity to select the appropriate user loyalty account 132 from the account list 142. Any other manner of determining the appropriate user loyalty account 132 can be employed by the loyalty system 140 and/or the merchant system 130.

In block 330, the loyalty system 140 transmits the user loyalty account 132 information to the merchant system 130. After identifying the appropriate user loyalty account 132, the loyalty system 140 can provide the account number of the user loyalty account 132 and any other suitable information to the merchant system 130. The information can be transmitted to the merchant system 130 or the merchant system 130 can be allowed to extract the user loyalty account information.

In block 335, the merchant system 130 uses the user loyalty account information to access the user loyalty account on the merchant system 130. The merchant system 130 can record new transaction information in the user loyalty account.

The user loyalty account 132 can be maintained by the merchant system 130 on the merchant server 135. The merchant server 135 can a remote system or the server 135 can be located at the location of the merchant system 130. Additionally or alternatively, the user loyalty account 132 can be maintained by the POS terminal 134. Additionally or alternatively, the POS terminal 134 can be a function of, or otherwise associated, with the merchant server 135. The user loyalty account 132 additionally or alternatively, can be maintained by a third party or other suitable party. Additionally or alternatively, the user loyalty account 132 can be maintained in a manner other than on a server. For example, the user loyalty account 132 can be maintained by a written system at a merchant system 130. The written system can be managed by an operator of the merchant system 130.

The merchant system can update the user loyalty account 132 automatically or manually after accessing the user loyalty account 132. For example, if a qualifying purchase is made by the user 101, the merchant system 132 can update the user loyalty account 132 by providing the appropriate number of reward points or other loyalty updates to the user loyalty account 132 on the merchant system 130. In another example, an operator of the merchant system 130 can input updated information into the user loyalty account 132 on the merchant system 130.

From block 345, the method 300 ends.

Other Example Embodiments

Figure 4:
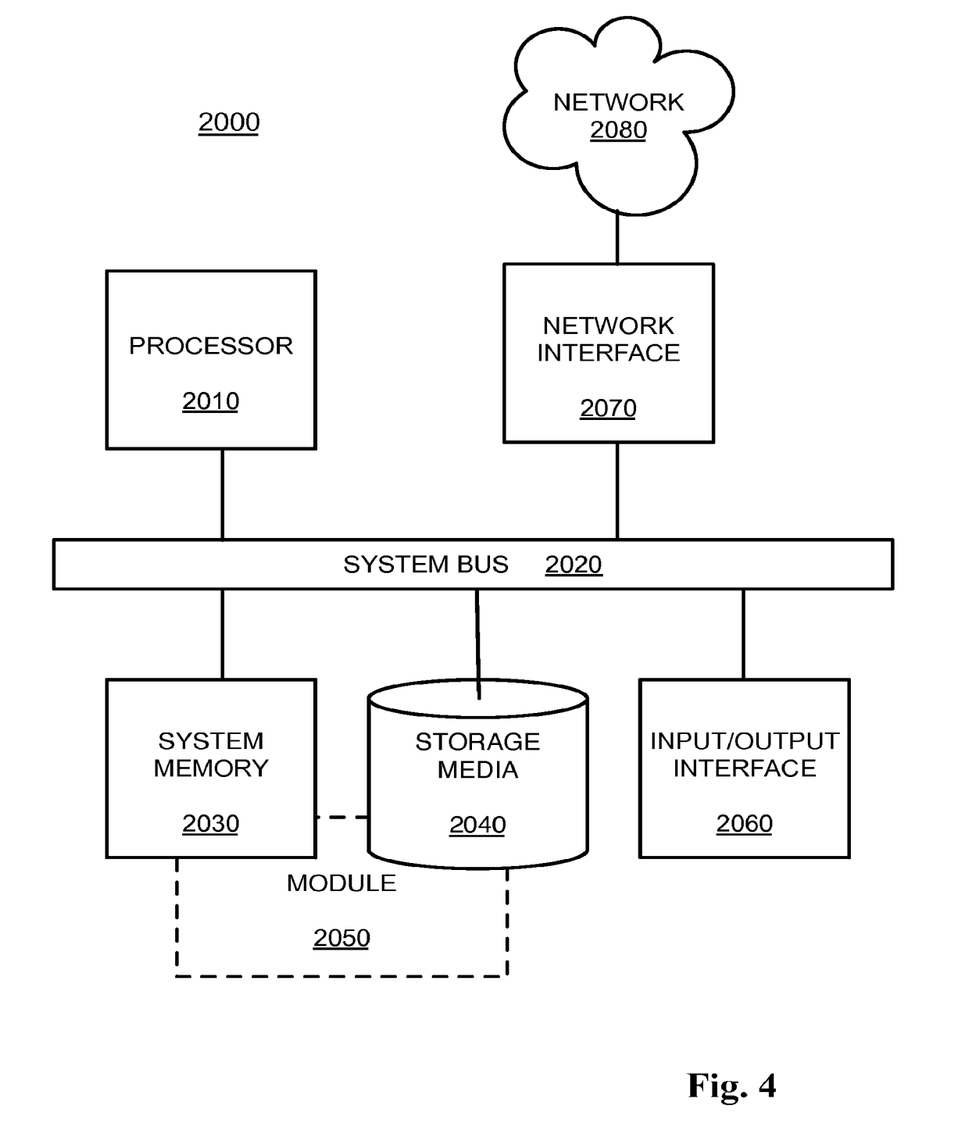
FIG. 4 is a block flow diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands.

The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for loyalty account identification, the computer-implemented method comprising:

associating, by a loyalty computing system comprising one or more computing devices, a list identifier with a loyalty account list maintained at the loyalty computing system, the loyalty account list comprising a plurality of user loyalty account numbers corresponding to a plurality of merchant computing devices;

receiving, by the loyalty computing system, a request from a merchant computing device, the request comprising the list identifier and a merchant identity associated with the merchant computing device, the list identifier received by the merchant computing device from a payment instrument on which the list identifier is encoded and wherein the list identifier is encoded on a secure element of a user computing device and the list identifier is provided to the merchant computing device via a wireless connection with the user computing device;

identifying, by the loyalty computing system, a user loyalty account number associated with the merchant computing device from the plurality of user loyalty account numbers based at least in part on the list identifier and the merchant identity associated with the merchant computing device, wherein the list identifier is used to determine a respective loyalty account list from a plurality of loyalty account lists stored at the loyalty computing system and the merchant identity is used to determine a respective user loyalty account number from the plurality of user loyalty account numbers included in the respective loyalty account list; and transmitting, by the loyalty computing system, the user loyalty account number associated with the merchant computing device to the merchant computing device.

2. The computer-implemented method of claim 1, wherein the payment instrument comprises a wireless payment instrument.

3. The computer-implemented method of claim 1, wherein the payment instrument comprises a digital wallet.

4. The computer-implemented method of claim 3, wherein the list identifier is encoded as a digital wallet identification code that is associated with a user digital wallet account of the digital wallet.

5. The computer-implemented method of claim 1, wherein the list identifier is received by the merchant computing system from the payment instrument in response to a user tapping the user computing device at a point of sale terminal.

6. The computer-implemented method of claim 1, wherein the request further comprises instructions from the payment instrument for accessing the loyalty computing system and using the loyalty account list to identify a user loyalty account.

7. The computer-implemented method of claim 1, further comprising registering, by the loyalty computing system, the merchant computing device with the loyalty computing system.

8. The computer-implemented method of claim 7, wherein registering the merchant computing device comprises associating a user loyalty account number associated with the merchant computing system with the loyalty account list.

9. The computer-implemented method of claim 1, wherein the payment instrument is used to initiate a purchase transaction.

10. The computer-implemented method of claim 1, wherein the merchant identity comprises at least one of a name, a code, a username, a password, or a phone number.

\* \* \* \* \*